Jan. 17, 1939. W. M. FLAHERTY 2,144,258
FILM TENSIONING DEVICE
Filed Nov. 16, 1936 2 Sheets-Sheet 1
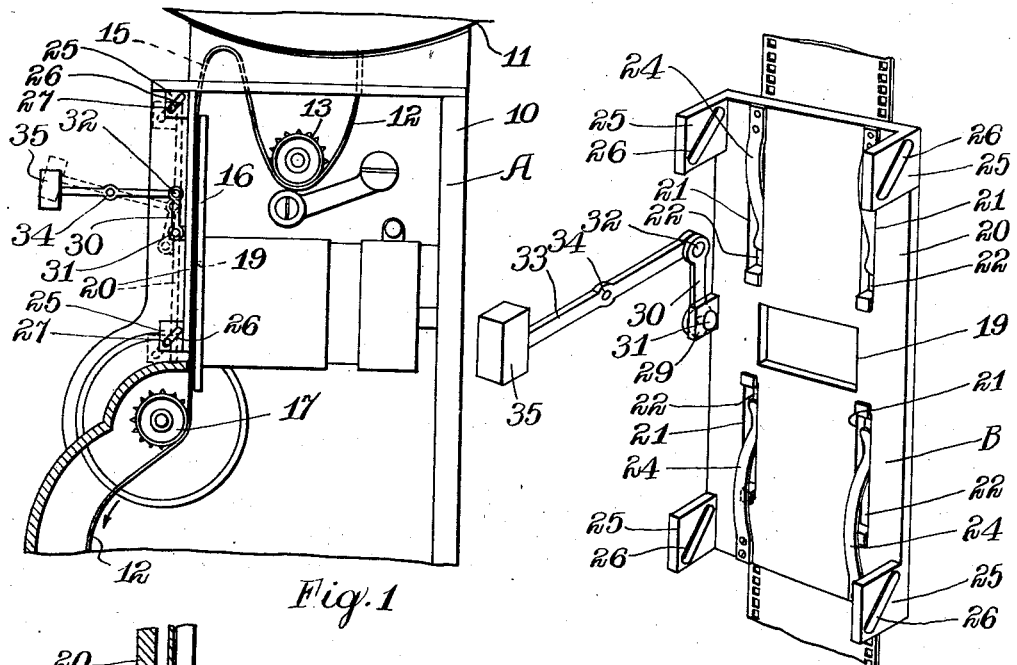
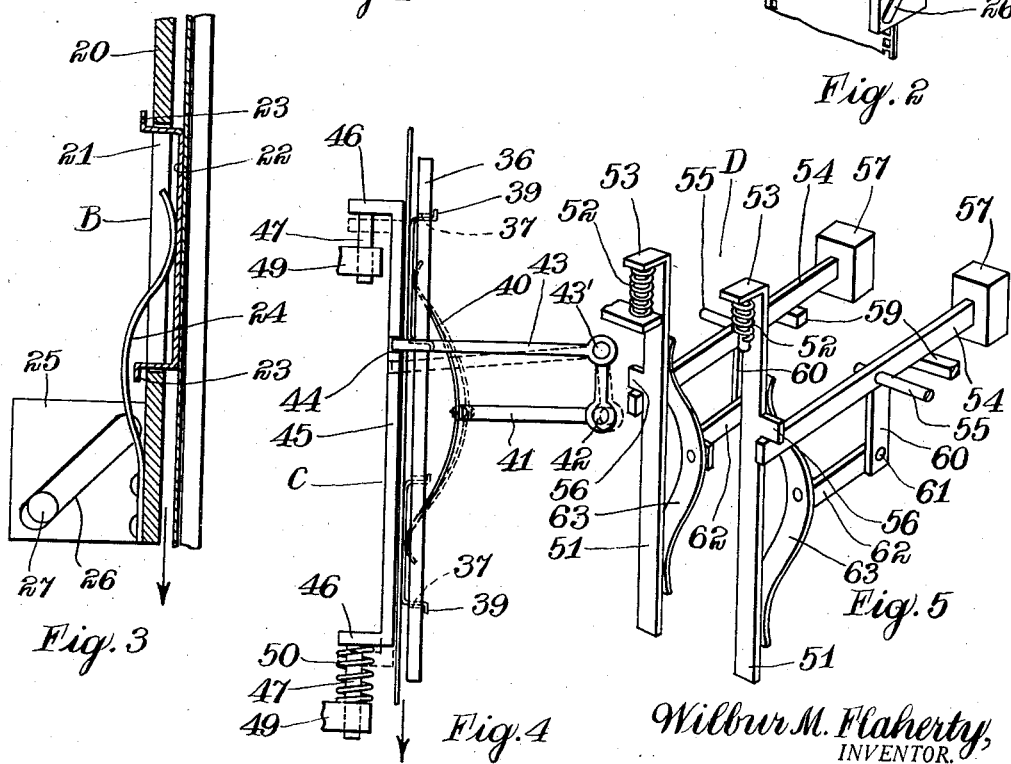
Wilbur M. Flaherty, INVENTOR.
BY
ATTORNEYS.

Jan. 17, 1939.   W. M. FLAHERTY   2,144,258
FILM TENSIONING DEVICE
Filed Nov. 16, 1936   2 Sheets-Sheet 2

Wilbur M. Flaherty,
INVENTOR.
BY
ATTORNEYS.

Patented Jan. 17, 1939

2,144,258

UNITED STATES PATENT OFFICE 2,144,258

FILM TENSIONING DEVICE

Wilbur M. Flaherty, Fort Dodge, Iowa

Application November 16, 1936, Serial No. 110,948

7 Claims. (Cl. 88—17)

My invention relates to an improvement in motion picture projecting machines, and has for its object the provision of a projector which will hold the film being projected at a tension which is automatically adjustable depending upon the condition of the film.

When motion picture films are produced, the emulsion side thereof is usually coated with a wax or the like, to cause the film to slip easily through the machine. From time to time however, new film will not be properly waxed; or even if waxed, will not slip through the projecting machine properly. In extreme cases, operators have been known to hold wax against the film as it passes through the machine in one way or another, to permit the film to pass through the machine.

Various attempts have been made to remedy this situation. Means for adjusting the tension of the friction pads against the film have been devised, so that the pressure against the film can be released or diminished if desired. There are certain disadvantages to such constructions, however. In the first place, if one portion of the film is oily, or waxed sufficiently, while another portion of the film is less slippery, the slippery portion will not be properly held by the tension device during the projection of the film, resulting in movement of the film during the projection period. If the adjustment for the film is such that the film will be properly held with the necessary friction during the projection of the slippery part of the film, there will be excess friction during the remainder of the film.

Operators of projection machines are apt to overlook the fact that there is excess pressure against a film as long as the projector operates properly. Excess friction against the film during the projecting process, however, causes strain on the intermittent sprocket or film actuating means, and creates the tendency for the sprocket teeth to tear the edges of the sprocket holes in the sides of the film. Such tearing of the sprocket holes causes the picture to be improperly framed; and if the holes tear completely out, stop the film before the aperture. A film remaining stationary in front of the aperture plate for a very few seconds will catch fire. Accordingly, green films which do not slip readily through the friction means holding the film over the aperture plate can create considerable damage, or can damage the film so that a slight additional strain will tear the sprocket holes entirely.

The purpose of the present invention is to avoid danger and to avoid injury to the film by the provision of an automatic means for adjusting the friction against the film. This construction is designed to automatically compensate for film which will not slip properly past the tensioning device readily, and to relieve the external pressure against the film when this film is green or sticky.

It is an object of my invention to utilize the force of friction against the tensioning means to regulate the pressure of the tensioning means against the film. Excessive friction therefore cannot be created against the film, and the tensioning device automatically will adjust itself to provide just the desired friction against the film.

These and other objects and novel features of my invention will be more clearly and fully set forth in the following specification and claims.

In the drawings forming a part of my specification:

Figure 1 is a sectional view through a portion of a moving picture projecting machine, illustrating my constant tension device incorporated thereon.

Figure 2 is a perspective view of my constant friction device.

Figure 3 is a cross-sectional view of a fragmentary portion of my device.

Figure 4 is a side view of a modified form of construction of my film tensioning device.

Figure 5 is a perspective view of a form of my film tensioning device very similar to that shown in Figure 4.

Figure 6:
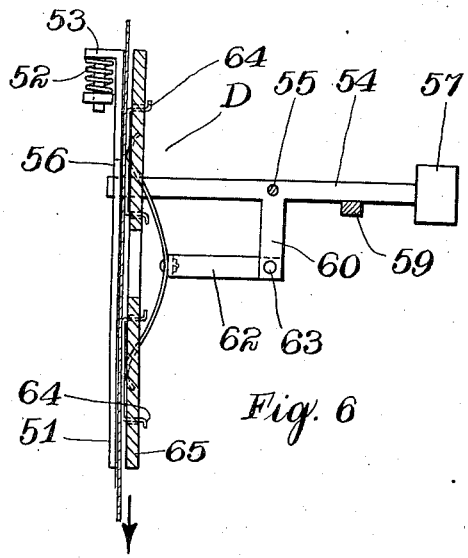
Figure 6 is a side elevation view of the form of construction illustrated in Figure 5 of the drawings.

The motion picture machine A is provided with a casing 10 at the top of which is positioned a reel housing 11. The film 12 extends down the reel within the housing 11, and between the upper film sprocket 13 and the idle roller 14. A loop 15 is formed between the sprocket 13 and the top of the shoe 16 forming a part of the film tensioning device. From the bottom of the shoe 16, the film passes over the intermittent sprocket 17, which draws the film 12 a step at a time past the aperture window 19.

In the type of construction illustrated in Figures 1, 2, and 3 of the drawings, the shoe 16 is mounted in a stationary position within the projecting machine A. A movable shoe or plate 20 is mounted outside the shoe 16. Slots 21 are cut through the plate 20, and friction pads 22 extend through these slots. Flanged ends 23 on the pads 22 hold these pads in position in the slots 21. Springs 24 secured to the plate 20 bear against the friction pads 22, urging them inwardly through the openings or slots 21 and against the film 12, which is positioned between the plate 20 and the shoe 16.

Flat ears 25 extend from the plate 20 in a direction normal to the plane of this plate. Each of the ears 25, which are formed at each corner of the plate, are provided with a diagonal slot 26 therein. Pins 27, secured to some stationary portion of the casing 10, extend through the slots 26 to mount the plate 20 in slidable relation with the shoe 16 on the casing 10. The aperture 19 for admitting light to the film extends through the plate 20, and through the shoe 16.

An ear 29 also extends normal to the plate 20. A link 30 is pivoted at 31 to this ear 29; and the link 30 is also pivotally connected at 32 to a lever arm 33. The lever arm 33 is pivoted at 34 to some stationary portion of the casing 10, and is provided with a counterbalance weight 35 on the opposite end of the pivot 34 from the connection of the link 30.

Excessive friction against the friction pads 22 causes a downward force on the plate 20. The plate 20, however, is supported in raised position by the weight 35. If the friction is sufficient to overbalance the upward effect of the weight 35 upon the plate 20, the plate will be drawn downwardly. Because the plate 20 is mounted upon pins extending through the slots 26, and because the slots 26 extend angularly with respect to the vertical, downward movement of the plate 20 will also result in outward movement, away from the film 12. The friction of the friction pads 22 is in this manner decreased, permitting the film 12 to slide past the film tensioning means with no strain upon either the sprocket or the film.

A slightly different form of construction, but illustrating the same operating principles, may be seen in Figure 4 of the drawings. This figure shows only the parts with which the present invention is concerned, and is applied to a projector in a manner demonstrated by Figure 1 of the drawings. This type of tensioning means C comprises a stationary shoe 36 having slots 37 therein similar to the slots 21 in the tensioning device B illustrated in Figures 1 to 3. Friction pads 39 are positioned in the slots 37, and a spring 40 holds the pads 39 against the film 12 under spring tension.

A link or arm 41 is secured to the spring 40, and is pivotally connected at 42 to a bell crank lever 43 pivoted at 43′ to some stationary part of the projection machine casing 10. The other end of the bell crank lever 43 is lodged in a notch 44 in a slidable shoe 45 engageable against the film 12 on the opposite side to that engaged by the friction pads 39. The shoe or plate 45 is provided with ears 46 normal to the plane of the plate 45, and pins 47 on these ears 46 extend through bearings 49 forming a part of the casing 10 of the machine A. Coil springs 50 urge the plate or shoe 45 upwardly under normal conditions.

When excess pressure is created between the shoe 45 and the film 12, the film moves the shoe 45 downwardly against the impulse of the springs 50. Downward movement of the shoe 45 pivots the bell crank lever 43 about its center 43′, and moves the end thereof pivotally connected to the arm 41 farther from the stationary shoe 36. This relieves the pressure against the spring 40, relieves the pressure against the friction pads 39, and permits free movement of the film 12 between the shoes 36 and 45.

It will be understood that the relieving of the friction pads will relieve the friction against the film 12. The friction will not, however, be entirely relieved, as the springs 50 will urge the shoe 45 upwardly as soon as the friction of the film thereagainst is relieved. Accordingly, a balance is reached, and the movement of the shoe 45 is only sufficient to lessen the tension sufficiently to permit the film to pass thereby without excessive strain. The necessary friction is constantly provided against the film.

Figure 7:
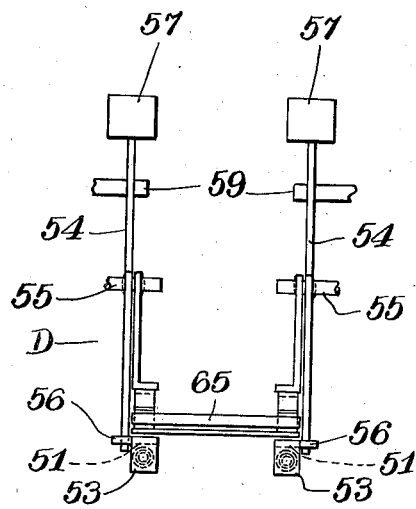
Figure 7 is a top plan view of the form of construction shown in Figures 5 and 6 of the drawings.

The constant tension device illustrated in Figures 5, 6 and 7 of the drawings is almost identical with that shown in Figure 4 of the drawings. In this device D, the movable shoes are preferably formed in two separate parts, and may act independently. Two spaced vertical slidable shoes 51 are slidably supported by the projector housing 10, and are urged upwardly by action of springs 52 acting against the flanged ends 53 of the shoes 51. If it is desired to move the shoes 51 in unison, they can be connected by a suitable cross bar. Lever arms 54, pivoted at 55 to a fixed part of the housing 10, engage a lug 56 on the slidable shoes 51 at one end, and are provided with a weight 57 at the other end thereof. Stops 59 limit the pivotal movement of the levers 54.

An arm 60 extends downwardly from each lever 54, forming in effect a bell crank. The arm 60 is pivotally connected at 61 to an arm 62, which is secured to the springs 63. The springs 63 engage against the friction pads 64, and urge these pads against the film 12 with spring tension. This assembled construction may be best seen in Figure 6 of the drawings.

Excessive friction against the shoes 51 tends to move these shoes downwardly against tension of the springs 52, and against the force of the weights 57. Downward movement of either of the shoes 51 acts to pivot the lever arm 54 connected therewith downwardly, raising the weight 57. This pivots the arm 60 rearwardly away from the stationary shoe 65 in which the friction pads 64 are mounted, relieving the tension of the spring 63. While the movement on both sides of the film is virtually uniform, any slight variation may be taken care of by having separate units for opposite sides of the film, as shown. When one side of the film pulls farther or harder than the other for any reason, pressure on that side is relieved to a greater extent.

Figure 8:
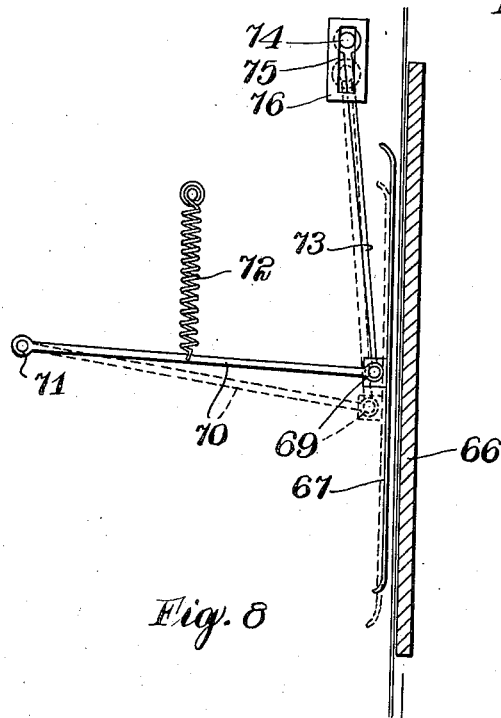
Figure 8 is a side elevation view of another type of construction, illustrating the parts diagrammatically.

In Figure 8 of the drawings, I diagrammatically illustrate a different type of construction. In this construction, the film 12 extends between a stationary shoe 66 and a movable shoe 67. The shoe 67 is pivotally connected at 69 to a lever 70, which is pivoted to a fixed point in the casing 10 at its other end 71. A spring 72 normally urges the lever 70 upwardly into a horizontal position, in which position the shoe 67 is closest to the shoe 66. A link 73, also pivoted at 69 to the shoe 67, is provided with an end 74 vertically slidable in a slot 75 in a fixed slide 76.

In operation, when excess friction occurs between the film 12 and the shoes 66 and 67, the shoe 67 is pivoted downwardly against the tension of the spring 72. Movement of the arm or lever 70 out of horizontal position decreases the horizontal distance between the centers of the pivots 69 and 71, thus relieving the friction against the film 12 and permitting the film to pass between the shoes 66 and 67 with no strain upon the film or upon the intermittent sprocket.

As may be seen, all of the above described devices operate to relieve the tension against the film passing between a pair of shoes adjacent the aperture plate of a moving picture projector. Each construction maintains a constant tension, regardless of the condition of the film.

In accordance with the patent statutes, I have described the principles of operation and construction of my moving picture projector, and while I have endeavored to set forth the best embodiments thereof, I desire to have it understood that obvious changes may be made within the scope of the following claims without departing from the spirit of my invention.

I claim:

1. A moving picture projector including a film, a pair of shoes engageable with opposed film surfaces adjacent the edges thereof and between which said film moves, and movably mounted means actuated by friction between said film and said shoes tending to move said shoes longitudinally of said film to separate said shoes to relieve the friction.

2. A motion picture projector including a film, a shoe over which said film moves, spring means creating tension between said shoe and said film, and means operated substantially longitudinally with the movement of said film by the friction of said shoe against said film upon excessive pressure to relieve the tension of said spring means.

3. A motion picture projector including a film, a pair of film engaging means engageable with opposed film surfaces adjacent the edges thereof and between which said film moves, means for moving said film engaging means together or apart, and means actuated by the friction of said film and the tendency of said film to move said film engaging means longitudinally for moving said moving means to move said film engaging means together or apart as said friction and tendency decreases or increases, respectively.

4. A motion picture projector including a film, a shoe over which said film moves, a spring means urging said film against said shoe, and means operable by an increase in tension between said shoe and said film to relieve the tension of said spring means.

5. A motion projector including a film, a shoe over which said film passes, a spring means urging said film against said shoe, means holding said spring means to create a tension between said film and said shoe, and means operable by an increase in friction between said shoe and film to operate said holding means to relieve said spring means to lessen said tension.

6. A motion picture projector including a film, a movable shoe over which said film passes, spring means carried by said movable shoe engageable against said film to create a desired amount of friction, means for holding said movable shoe normally in one position with said spring means tightly pressed against said film, and means operated by increased friction between said springs and said film to move said movable shoe away from said film to decrease the tension against the film of the spring means carried thereby.

7. A motion picture projector including a film, a movable shoe over which said film passes, means mounting said shoe for movement toward or away from said film, means for normally holding said shoe against said film, and means operable upon an increase of tension between the film and the shoe to move said shoe away from the film to decrease the tension.

WILBUR M. FLAHERTY.